UNITED STATES PATENT OFFICE.

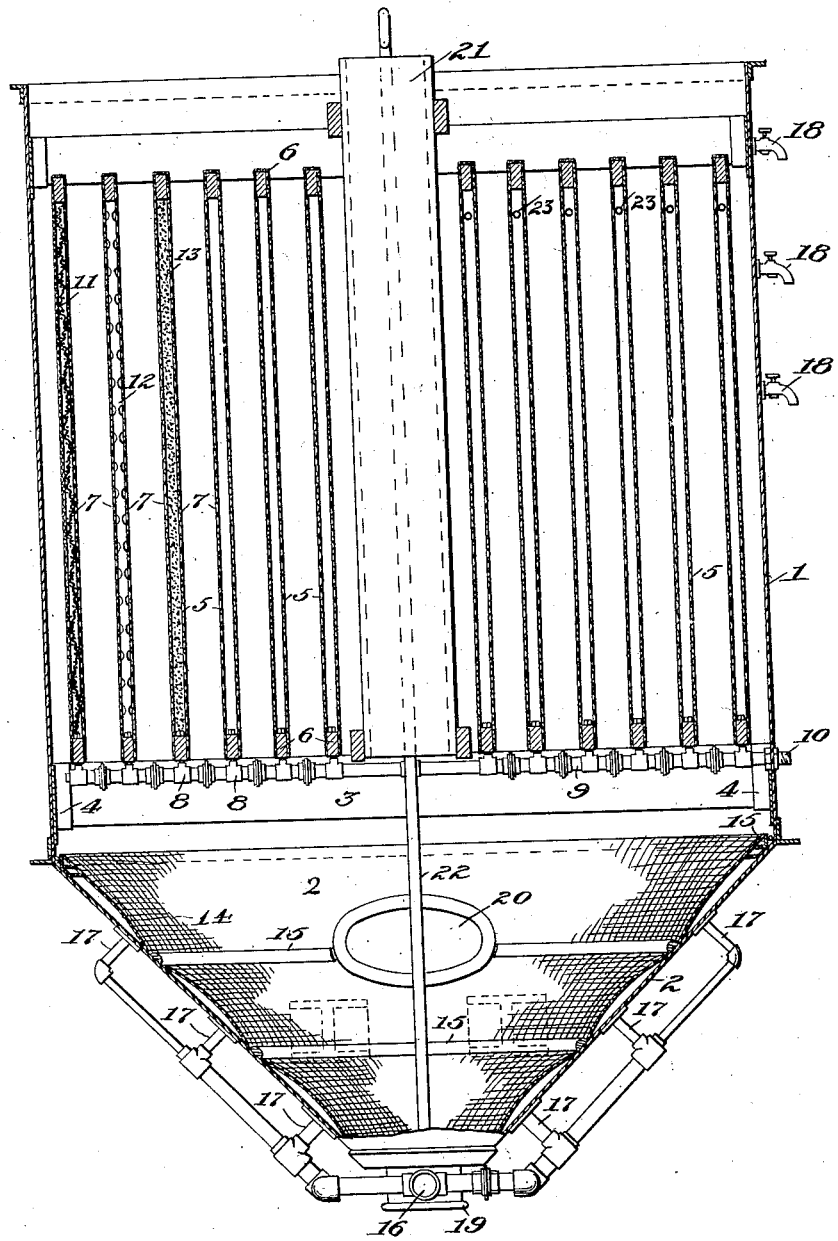

WILBUR ALSON HENDRYX, OF DENVER, COLORADO.

METHOD OF RECOVERING SOLUTIONS.

No. 870,289.

Specification of Letters Patent.

Patented Nov. 5, 1907.

Application filed April 25, 1907. Serial No. 370,319.

*To all whom it may concern:*

Be it known that I, WILBUR ALSON HENDRYX, a citizen of the United States, residing at Hotel Metropole, in the city of Denver, in the county of Denver and State of Colorado, have invented new and useful Improvements in Methods of Recovering Solutions, of which the following is a specification.

The object of this invention is to provide a method of recovering liquids from solids, the method being particularly applicable to the recovery of solutions containing gold, silver, copper, or other metallic values dissolved in their respective solvents, from ore pulp. The method may be carried out in any suitable apparatus, as for instance in an apparatus of the character described in my copending application Serial No. 329,811, filed August 9, 1906. A modified form of apparatus suitable for carrying the invention into effect is shown in the accompanying drawing, wherein the figure is a central vertical section.

Referring to the drawing, 1 represents a tank which may be of any suitable shape or dimensions, but is preferably rectangular, having a converging bottom 2. Within the tank and preferably just above the bottom 2 are arranged transverse timbers 3 carried by sockets 4 or otherwise held, and serving to support a plurality of filters or filter cells 5. In its preferred form each of these cells comprises a rectangular framework 6, conveniently of wood; filter bags 7 of canvas or other material are drawn over the frames 6, and their open ends secured by any suitable means. Each filter cell has a suitable discharge 8 preferably at the bottom of the frame, the several cells being shown as connected to a common main 9 terminating in an outlet 10.

In order to keep the walls of the cells distended under the weight of the material in the tank I prefer to provide in each cell a non-metallic pervious filling capable of preventing the collapse or serious displacement of the filtering walls, while at the same time affording a free passage for the filtered solution. Metallic fillings as iron wire, etc., are objectionable as exhibiting a tendency to react with or dissolve in the solution used, under certain conditions, and also by reason of their tendency to corrode and to cause the decay of the filtering sacks, or otherwise to weaken them; furthermore such fillings decrease the filtering capacity of the cloths by obstructing their interstices. One filling material which I have found suitable for this purpose is cocoa matting, which may be flexed to form a filling or otherwise disposed. A filling of this character is indicated at 11 in the figure. As a modified means for supporting the filter walls I have also shown in the figure a spacing strip 12, conveniently of wood, of which any required number may be used, the several strips being cut away at the sides as shown to provide the maximum practicable filtering area. Or the cells may be filled or packed with strips, blocks or pieces of wood or other material which may be of irregular shape and of uniform size as shown at 13 in the figure. In all cases the essential feature is the provision of a filling capable of supporting the walls or preventing substantial displacement thereof while providing a free passage way for the filtered liquid.

14 represents a filtering layer preferably of canvas, disposed over the converging bottom 2 of the tank and shown as secured by cleats or strips 15. Beneath this filtering layer 14 I may also dispose a spacing layer or filling of cocoa matting or other suitable material. The main conduit 16 communicates through a plurality of branch pipes 17 with the space or spaces beneath the filter 14.

The tank 1 is also provided with one or more cocks 18, disposed at various levels and serving to draw off clear but unfiltered solution as hereinafter described; a sludge gate 19 permits the quick discharge of the contents of the tank. 20 represents a manhole affording access to the lower portion of the tank, and 21 represents a box or pipe through which the charge is fed to the apparatus, and 22 represents the rod which operates the gate 19. 23 represents inlet openings for the passage of liquid used in discharging the accumulated pulp mass from the frames 5.

The method may be practiced by means of the above-described apparatus substantially as follows: A charge of material is introduced into the tank through the box or pipe 21. Wash water, barren solution or the like leaching agent is introduced through pipe 16, passing by the several branch pipes 17 to the space or spaces beneath the filter or distributing device 14. The liquid so introduced passes upward through the body of ore pulp and is discharged through the filter cells 5.
The liquid may be introduced at such rate, and so uniformly distributed beneath the body of ore pulp, as to rise through the latter without substantial disturbance of the mass, any particles carried by the upwardly moving liquid current being separated therefrom by the filters 5. In case the displaced liquid is substantially clear, the same or any portion of it may be decanted through the cocks 18.

It will be understood that in operating in this manner the filter 14 serves as a very effective distributer for the inflowing liquor, while the cells 5 serve to distribute the outflowing liquor. By this even distribution of both inflowing and outflowing liquor any tendency to the production of channels in the charge is avoided, and the displacement of the metal-bearing solution or the like is rendered more rapid as well as more effective.

After the pulp mass has been substantially separated from the metal bearing solutions, wash water is run into the frames by means of the openings 23, and the accumulated pulp is discharged from the frames 5 and run out by means of the sludge gate 19.

I claim:

1. The method of recovering solutions which consists in introducing a liquid beneath a charge containing a solid and a solution, displacing the solution by the upward flow of such liquid, and filtering and thereby withdrawing the displaced solution.

2. The method of recovering solutions which consists in introducing a liquid in a substantially uniform manner beneath a charge containing a solid and a solution, displacing the solution by the upward flow of such liquid, and filtering and thereby withdrawing the displaced solution.

3. The method of recovering solutions which consists in introducing a liquid in a substantially uniform manner beneath a charge containing a solid and a solution, displacing the solution by the upward flow of such liquid, and withdrawing the displaced solution at a plurality of points.

In testimony whereof I affix my signature in presence of two witnesses.

WILBUR ALSON HENDRYX.

Witnesses:
DONALD F. IRVIN,
THEODORA WELLS.